United States Patent
Espiau et al.

(10) Patent No.: US 8,154,216 B2
(45) Date of Patent: *Apr. 10, 2012

(54) EXTERNAL RESONATOR/CAVITY ELECTRODE-LESS PLASMA LAMP AND METHOD OF EXCITING WITH RADIO-FREQUENCY ENERGY

(75) Inventors: Frederick Matthew Espiau, Topanga, CA (US); Mehran Matloubian, Encino, CA (US)

(73) Assignee: Topanga Technologies, Inc., Canoga Park, CA (US)

( * ) Notice: Subject to any disclaimer, the term of this patent is extended or adjusted under 35 U.S.C. 154(b) by 254 days.

This patent is subject to a terminal disclaimer.

(21) Appl. No.: 12/589,795

(22) Filed: Oct. 27, 2009

(65) Prior Publication Data

US 2010/0072910 A1 Mar. 25, 2010

Related U.S. Application Data

(63) Continuation of application No. 11/981,884, filed on Oct. 31, 2007, which is a continuation-in-part of application No. 11/543,736, filed on Oct. 4, 2006, now Pat. No. 7,291,985.

(60) Provisional application No. 60/723,144, filed on Oct. 4, 2005.

(51) Int. Cl.
*H05B 41/16* (2006.01)
(52) U.S. Cl. .................. 315/248; 315/111.21; 315/344; 315/39.51; 313/231.61; 313/231.71
(58) Field of Classification Search .................. 315/248, 315/344, 39, 39.51, 39.53, 246, 111.21, 111.41; 313/160, 161, 155, 573, 231.31, 231.61, 313/231.71
See application file for complete search history.

(56) References Cited

U.S. PATENT DOCUMENTS

| 5,013,959 | A | 5/1991 | Kogelschatz |
| 6,018,218 | A | 1/2000 | Terada et al. |
| 6,737,809 | B2 | 5/2004 | Espiau et al. |
| 7,291,985 | B2 * | 11/2007 | Espiau et al. ............. 315/248 |
| 7,830,092 | B2 * | 11/2010 | Espiau et al. ............. 315/39 |

(Continued)

FOREIGN PATENT DOCUMENTS

EP 1 601 003 A 11/2005

(Continued)

OTHER PUBLICATIONS

1st Office Action for Chinese Patent Application No. 200680036692.9, dated Oct. 4, 2006.

(Continued)

*Primary Examiner* — Haiss Philogene
(74) *Attorney, Agent, or Firm* — Tope-McKay & Associates; Marcus Risso

(57) ABSTRACT

Described is a plasma electrode-less lamp. The device comprises an electromagnetic resonator and an electromagnetic radiation source conductively connected with the electromagnetic resonator. The device further comprises a pair of field probes, the field probes conductively connected with the electromagnetic resonator. A gas-fill vessel is formed from a closed, transparent body, forming a cavity. The gas-fill vessel is not contiguous with (detached from) the electromagnetic resonator and is capacitively coupled with the field probes. The gas-fill vessel further contains a gas within the cavity, whereby the gas is induced to emit light when electromagnetic radiation from the electromagnetic radiation source resonates inside the electromagnetic resonator, the electromagnetic resonator capacitively coupling the electromagnetic radiation to the gas, which becomes a plasma and emits light.

31 Claims, 4 Drawing Sheets

U.S. PATENT DOCUMENTS

| | | | |
|---|---|---|---|
| 2001/0035720 A1 | 11/2001 | Guthrie et al. | |
| 2005/0029947 A1 | 2/2005 | Kraus et al. | |
| 2006/0097657 A1* | 5/2006 | Kogure | 315/248 |

FOREIGN PATENT DOCUMENTS

| | | | |
|---|---|---|---|
| GB | 2 413 005 A | 10/2005 | |
| JP | 2006 040867 A | 2/2006 | |
| WO | WO 2004/059694 A | 7/2004 | |
| WO | WO 2006/006129 A | 1/2006 | |

OTHER PUBLICATIONS

Response to 1st Office Action for Chinese Patent Application No. 200680036692.9, dated Oct. 4, 2006.

Notification for the Grant of Invention Patert Right (Notice of Allowance) for Chinese Patent Application No. 200680036692.9, dated Oct. 4, 2006.

PCT International Search Report and the Written Opinion of the International Searching Authority for PCT/US2006/038787, dated Oct. 4, 2006.

PCT International Preliminary Report on Patentability for PCT/US2006/038787, dated Oct. 4, 2006.

PCT International Search Report and the Written Opinion of the the International Sarching Authority for PCT/US2007/007696, dated Mar. 28, 2007.

PCT International Preliminary Report on Patentability for PCT/US2007/007696, dated Mar. 28, 2007.

* cited by examiner

EXTERNAL RESONATOR/CAVITY ELECTRODE-LESS PLASMA LAMP AND METHOD OF EXCITING WITH RADIO-FREQUENCY ENERGY

PRIORITY CLAIM

The present application is a continuation of prior application Ser. No. 11/981,884, filed on Oct. 31, 2007, entitled "External Resonator Electrode-Less Plasma Lamp and Method of Exciting with Radio-Frequency Energy" which claims the benefit of U.S. Utility application Ser. No. 11/543,736, filed on Oct. 4, 2006, entitled "External Resonator/Cavity Electrode-Less Plasma Lamp and Method of Exciting With Radio-Frequency Energy", now U.S. Pat. No. 7,291,985, which claims the benefit of U.S. Provisional Application No. 60/723,144, filed on Oct. 4, 2005, entitled, "External Resonator/Cavity Electrode-less Plasma Lamp and Method of Exciting with Radio-Frequency Energy."

FIELD OF INVENTION

The field of the present invention relates to devices and methods for generating light, more particularly to the field of plasma lamps, and still more particularly to plasma lamps driven by a radio-frequency source without the use of internal electrodes or surrounding dielectric bodies that enhance electromagnetic field coupling. Additionally, the field of the present invention relates to devices and methods where the lamp is not incorporated or a subset of a microwave resonator, a cavity or a waveguide, in particular the lamp and resonator or cavity structure are not geometrically contiguous.

BACKGROUND OF INVENTION

Plasma lamps provide extremely bright, broadband light, and are useful in applications such as projection systems, industrial processing, and general illumination. The typical plasma lamp manufactured today contains a mixture of gas and trace substances that are excited to form a plasma. Plasma interaction with the trace substance (Selenium or other) gives rise to light in the UV, visible, and near infrared portions of the electromagnetic spectrum. Gas ionization resulting in plasma formation is accomplished by passing a high-current through closely-spaced electrodes contained within the vessel that is the gas fill reservoir. This arrangement, however, suffers from electrode deterioration due to sputtering, and therefore exhibits a limited lifetime.

Electrode-less plasma lamps driven by microwave sources have been disclosed in the prior art. For example, both U.S. Pat. No. 6,617,806B2 (Kirkpatrick et. al.) and US Patent Application Number US2001/0035720A1 (Guthrie et. al.) disclose similar basic configurations of a gas fill encased either in a bulb or a sealed recess within a dielectric body forming a waveguide, with microwave energy being provided by a source such as a magnetron and introduced into the waveguide and heating the plasma resistively. U.S. Pat. No. 6,737,809B2 (Espiau et. al.) discloses a somewhat different arrangement whereby the plasma-enclosing bulb and the dielectric cavity form a part of a resonant microwave circuit with a microwave amplifier to provide the excitation.

In each of the embodiments described above, a dielectric or metal/dielectric waveguiding body forming—whether deliberately or unwittingly—a resonant cavity surrounding the bulb containing the plasma is used. The driving microwave energy is introduced into the waveguide body using various probing means well-known to those skilled in the art of microwave engineering. The waveguide body surrounding the bulb brings with it a host of difficulties including wasted light, lamp size related to resonance or excitation frequency, manufacturing obstacles, and related costs. These obstacles are overcome by the approach presented herein.

SUMMARY OF INVENTION

This invention provides distinct advantages over electrode-less plasma lamps in the background art. Firstly, using an external resonator or cavity structure enables lamp operation at frequencies well below 1 GHz, lowering lamp cost and extending the range of lamp applications. Removal of the lamp from the dielectric waveguide body furthermore allows increased light harvesting, a serious drawback of the approaches previously discussed in the art. Finally, by removing the fundamental compromise between dimensions of the dielectric waveguide body and operating frequency, it is possible to substantially reduce lamp size to again extend the applications range. Moreover, in addition to these three substantial advantages, these lamps still form bright, spectrally stable sources that exhibit energy efficiency and prolonged lifetimes. Rather than incorporating the gas-fill (lamp) as a subset of the dielectric waveguiding body, the lamp is capacitively or inductively or a combination of capacitively and inductively driven by an external resonant circuit that delivers the required field to the gas fill to sustain the plasma.

Briefly, the lamp includes an amplified RF source operating in the frequency range between approximately 10 MHz to 10 GHz and emitting powers approximately as great as 10 W. The lamp further includes an external resonator in the embodiment of a lumped circuit or dielectric cavity (an example of which might be a can resonator), which follows the RF source and is intended to provide the necessary potential drop to sustain the plasma. In its simplest implementation the resonant circuit comprises a parallel resistor, capacitor, inductor network, but is not limited to this configuration, and all other configurations are meant for inclusion by extension. The lamp further includes a closed vessel; the approximate diameter of the vessel might be 6 mm, but, as can be appreciated by one of ordinary skill in the art, this size varies depending on the application. This closed vessel contains the gas fill. Portions of the outside walls of the vessel can be coated or in intimate mechanical contact with a metallic layer used to capacitively couple the RF energy to the plasma.

An outline for producing light with the lamp includes, but is not limited to, the steps: a) RF/microwave energy is directed at a resonator, which is not geometrically contiguous with (detached from) the glass fill, the resonator may be in the form of a lumped circuit or distributed structure; b) field probes situated at positions where the field strength is maximum in the resonator direct the RF energy to the bulb; and c) the RF energy is capacitively coupled to the plasma through the metallic contacts on the gas fill vessel.

In one aspect, the lamp comprises an electromagnetic resonator and an electromagnetic radiation source conductively connected with the electromagnetic resonator. A first field probe and second field probe are conductively connected with the electromagnetic resonator. The lamp also includes a gas-fill vessel not contiguous with (detached from) the electromagnetic resonator with a closed, transparent body. The transparent body has an outer surface and an inner surface, the inner surface forming a cavity containing an inert gas such as Argon. The gas fill vessel is capacitively coupled with the first field probe and the second field probe. A fluorophor or other light emitters such as Selenium, Mercury, Sodium, Sulfur or a metal halide salt such as Indium Bromide, Scandium Bromide, Cesium Iodide, or a combination of them is contained within the cavity of the gas-fill vessel. The fluorophor fluoresces or the light emitter emits light when electromagnetic radiation from the electromagnetic radiation source resonates inside the electromagnetic resonator, which capacitively or inductively or combination of capacitively and inductively couples the electromagnetic radiation to the gas-fill vessel containing the fluorophor or other light emitting materials such as Selenium, Mercury, Sodium, Sulfur or a metal halide salt such as Indium Bromide, Scandium Bromide, Cesium Iodide, or a combination of them.

In another aspect, the lamp includes a first conductor and a second conductor that form a transmission line. Each conductor has a conductor probe end conductively connected with a field probe and a conductor vessel end connected with the gas fill vessel. Thus the transmission line formed by the two conductors capacitively couples electromagnetic radiation into the gas-fill vessel.

In yet another aspect, the first conductor and the second conductor are constructed and arranged to impedance-match the electromagnetic resonator to the gas-fill vessel.

In yet another aspect, the lamp includes an impedance-matching network. The impedance-matching network conductively connects the first field probe with the gas fill vessel and the second field probe with the gas-fill vessel. Thus the impedance-matching network enables a substantially maximal amount of energy to be transferred to the gas-fill vessel when energy is stored in the electromagnetic resonator.

In yet another aspect, the gas-fill vessel contains a gas such as Argon. The electromagnetic resonator capacitively couples the electromagnetic radiation to the fluorophor or other light emitters such as Selenium, Mercury, Sodium, Sulfur or a metal halide salt such as Indium Bromide, Scandium Bromide, Cesium Iodide, or a combination of them, by inducing the gas to become a plasma, which then transfers energy to the fluorophor or other light emitters, causing the fluorophor to fluoresce or other light emitters to emit light.

In yet another aspect, the electromagnetic radiation source is a tunable oscillator, which is tuned to maximize light output.

In yet another aspect, the electromagnetic resonator is a lumped circuit comprising lumped circuit components.

In yet another aspect, the electromagnetic resonator is a distributed structure.

In yet another aspect, the electromagnetic resonator comprises both lumped circuit components and distributed structures.

In yet another aspect, the electromagnetic resonator is tunable, whereby the electromagnetic resonator is tuned to maximize light output.

In yet another aspect, the gas-fill vessel includes a covered portion of its outer surface. A refractory veneer is connected with the covered portion of the outer surface of the gas-fill vessel, and a conductive veneer is connected with the refractory veneer so that the refractory veneer is between the covered portion and the conductive veneer. Either the first field probe or the second field probe is conductively connected with the conductive veneer. In this aspect, the refractory veneer acts as a diffusion barrier between the gas-fill vessel and the conductive veneer.

In yet another aspect, the outer surface of the gas-fill vessel's transparent body includes a reflective portion and a non-reflective portion. Emitted light is made to reflect from the reflective portion and escape through the non-reflective portion, forcing the light to escape into a substantially smaller solid angle.

Finally, the present invention also comprises a method for forming and using the device. The method for forming the device comprises a plurality of acts of forming and attaching the various parts as described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
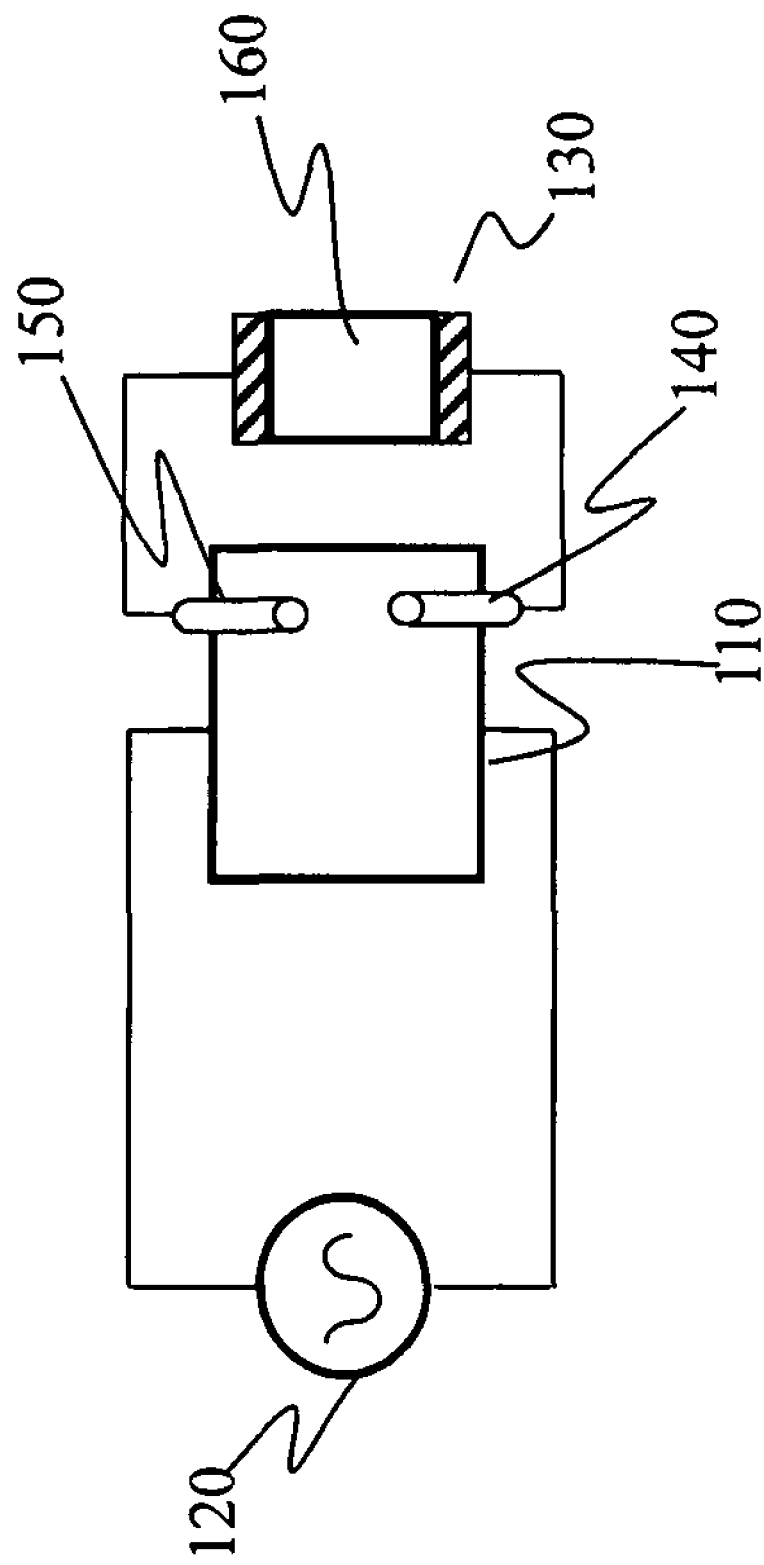
FIG. 1 is a generalized schematic of the proposed invention, an RF source drives a resonator, which, in turn, drives a gas-fill vessel not geometrically contiguous with (detached from) the resonator.

The present invention relates to a plasma lamp and, more particularly, to a plasma lamp without electrodes and having a gas-fill vessel that is not contiguous with (detached from) any RF/microwave cavities or resonators. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

(1) Glossary

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Distributed Structure—The term "distributed structure" as used with respect to this invention refers to an RF/microwave structure, the dimensions of which are comparable to the wavelength of the frequency source. This could be a length of a transmission line or a resonator.

Feedback-induced Oscillations—The term "feedback-induced oscillations" as used with respect to this invention refers to feeding back (in an additive sense/substantially in-phase) part of the output power of an amplifier back into the input of the amplifier with sufficient gain on the positive-feedback to make the amplifier oscillate.

Fluorescence—The term "fluorescence" as used with respect to this invention refers to the emission of radiation associated with the relaxation of an atom or molecule from an excited energy level to a lower (usually ground state) level.

Fluorophor or light emitter—The term "fluorophor" as used with respect to this invention refers to a material that undergoes fluorescence (see above definition of fluorescence). Light emitter also refers to emission of radiation associated with the relaxation of an atom or molecule from an excited energy level to a lower (usually ground state) level. Examples include, but are not limited to, any material such as Selenium, Mercury, Sodium, Sulfur or a metal halide salt such as Indium Bromide, Scandium Bromide, Cesium Iodide, or the metal atoms from the halide salts, or a combination of materials that will emit radiation in the visible spectrum at elevated temperatures. Part of the spectrum emitted by the light emitter can be in the UV or infrared region.

Lumped Circuit—The term "lumped circuit" as used with respect to this invention refers to a circuit comprising actual resistors, capacitors and inductors as opposed to, for example, a transmission line or a dielectric resonator (circuit components that are comparable in size to the wavelength of the RF source).

Lumped Parallel Oscillator—The term "lumped parallel oscillator" as used with respect to this invention refers to resistors, capacitors, and inductors that are connected in parallel to form a resonator.

Parasitics—The term "parasitics" as used with respect to this invention refers to non-idealities in the components, in this case, used to distribute energy. These are "extra" resistances, capacitances and inductances of the components that effectively waste the power of the RF/microwave source.

Refractory—The term "refractory" as used with respect to this invention refers to a material having the ability to retain its physical shape and chemical identity when subjected to high temperatures.

(2) Specific Aspects

FIG. 1 illustrates a general/generic embodiment of the electrode-less lamp. An electromagnetic resonator 110 is driven by an electromagnetic radiation source 120, the radiation being in the microwave/RF portions of the electromagnetic spectrum. The RF/microwave energy stored in the electromagnetic resonator 110 gives rise to large electric fields, which are sampled by a field first field probe 140 and second field probe 150. As can be appreciated by one of ordinary skill in the art, it does not matter which of the field probes is designated "first" or "second." Subsequently the electric field is distributed to the gas-fill vessel 130, which is not geometrically contiguous with (detached from) the electromagnetic resonator 110. The gas-fill vessel 130 includes a cavity 160 that contains a gas. The gas transitions into a plasma state under the presence of the RF energy; this gas is normally a noble gas but is not limited to one of the noble gases. Subsequent energy transfer between the plasma and the fluorophor light emitter, also included in the gas-fill vessel 130, gives rise to intense visible, UV, or infrared radiation, usable in a multitude of lighting applications.

In one embodiment, the RF/microwave electromagnetic radiation source 120 comprises an energy source followed by several stages of amplification so that the overall power delivered to the electromagnetic resonator 110 is in the 10 to 200 W range, although powers outside this range might be necessary depending on the application and would also be accessible with this invention. Although the electromagnetic radiation source 120 is shown as an agglomeration of solid state electronics, it may also comprise other sources known to one of ordinary skill in the art. In another embodiment, the RF/microwave electromagnetic radiation source 120 comprises an RF/microwave oscillator. Feedback between the amplification stages 210 and the electromagnetic resonator 110 is used to build up a sustained RF energy source that drives the electromagnetic resonator 110 and consequently the gas-fill vessel 130.

The electromagnetic resonator 110 can be embodied as a distributed RF/microwave structure, such as a can resonator, or as a lumped circuit, such as a parallel RLC network. In the case of a distributed resonator, the RF/microwave electric field varies in amplitude as a function of position within it. In this case, the first and second field probes 140 and 150 are positioned so as to sample the maximum field amplitude within the electromagnetic resonator. For a lumped parallel resonator the field is independent of position along it and first and second field probes 140 and 150 can be placed arbitrarily. The electromagnetic resonator 110 has a distinctive frequency behavior enabling energy storage over a limited frequency range. In the case of a distributed structure this frequency range is determined by geometry and material parameters, whereas in the case of a lumped resonator, this same frequency of operation is determined by circuit topology and component values.

As can be appreciated by one of ordinary skill in the art, plasma lamp operation substantially near 100 MHz enables RF energy distribution with minimal impact from parasitics, which are non-idealities in the components used to distribute energy. These parasitics are typically a function of frequency and increase in severity with increasing frequency. Additionally, by operating at a lower frequency, lamp cost can be reduced enabling penetration of this technology into the existing lamp socket markets. However, operation in this frequency range places a constraint on lamp geometry/material parameters in order to effectively couple RF energy into the plasma, thereby limiting the range of applications. As operational frequency is increased this constraint is relaxed enabling the use of smaller light bulbs. In particular as high-frequency, high-power amplifiers mature, dropping their cost, operation substantially near 10 GHz will facilitate effective light point sources, which are desirable in many high-end applications.

Figure 2B:
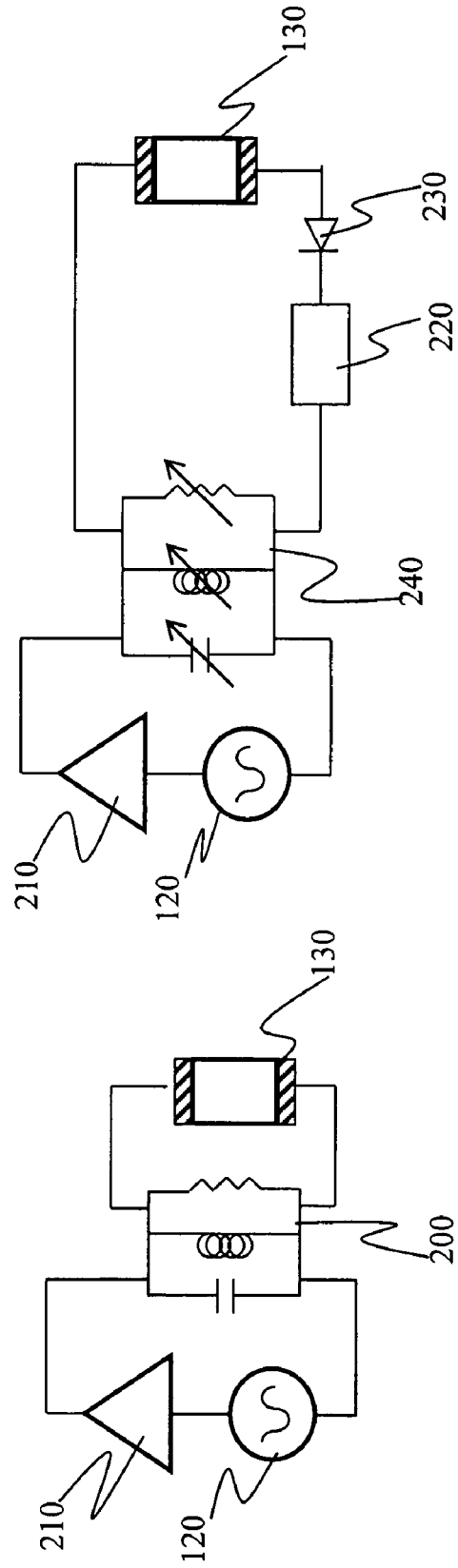
FIG. 2b is a lumped RLC electrode-less plasma lamp driven by a(n) Radio Frequency (RF) source; the RLC resonator is composed of tunable elements controlled by a tuning circuit, with feedback providing information to the tuning circuit, which, in turn, tunes the resonator to maximize the RF energy delivered to the gas-fill vessel.
Figure 2A:
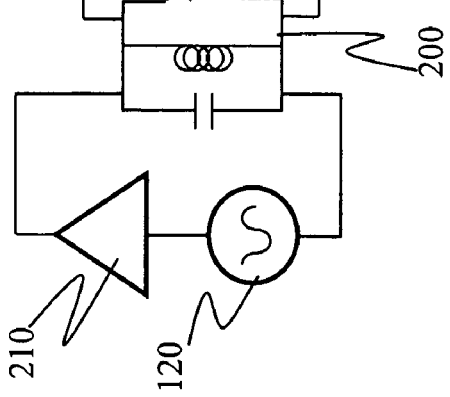
FIG. 2a is a lumped Resistor/Inductor/Capacitor (RLC) electrode-less plasma lamp driven by an RF source, as opposed to being a subset of an RF oscillator.

FIG. 2A illustrates an embodiment of the plasma electrode-less lamp where the electromagnetic resonator 110 is a lumped resonator 200. In this case the lumped resonator 200 comprises a parallel RLC circuit that stores the energy delivered by the amplification stages 210 and consequently develops a large potential drop. This implementation is preferred in the lower operating frequency range of the lamp. RF/microwave energy is delivered to the gas-fill vessel 130, which gives off intense radiation. In this embodiment amplification stages 210 are driven by an RF/microwave source 120 at the resonance frequency of the electromagnetic lumped resonator 200. Lamp operation at frequencies substantially less than 100 MHz enables RF distribution with minimal parasitic impact, which makes the use of simple cabling to deliver RF energy to the gas-fill vessel feasible.

FIG. 2B illustrates an embodiment of the plasma electrode-less lamp with a tunable lumped resonator 240. As with FIG. 2A, the resonator is driven by an electromagnetic radiation source 120 and amplification stage 210 combination. An RF/microwave sensor 230 measures the amount of energy not delivered to the gas-fill vessel 130 and provides feedback to a tuning circuit 220. In turn, the tuning circuit adjusts the tunable lumped resonator's 240 resonance frequency to maximize the energy delivered to the gas-fill vessel 130. This enables a reduction in wasted RF energy and therefore provides enhanced lamp efficiency. Feedback approaches are not limited to lumped resonators and can be extended to distributed structures.

Figure 3:
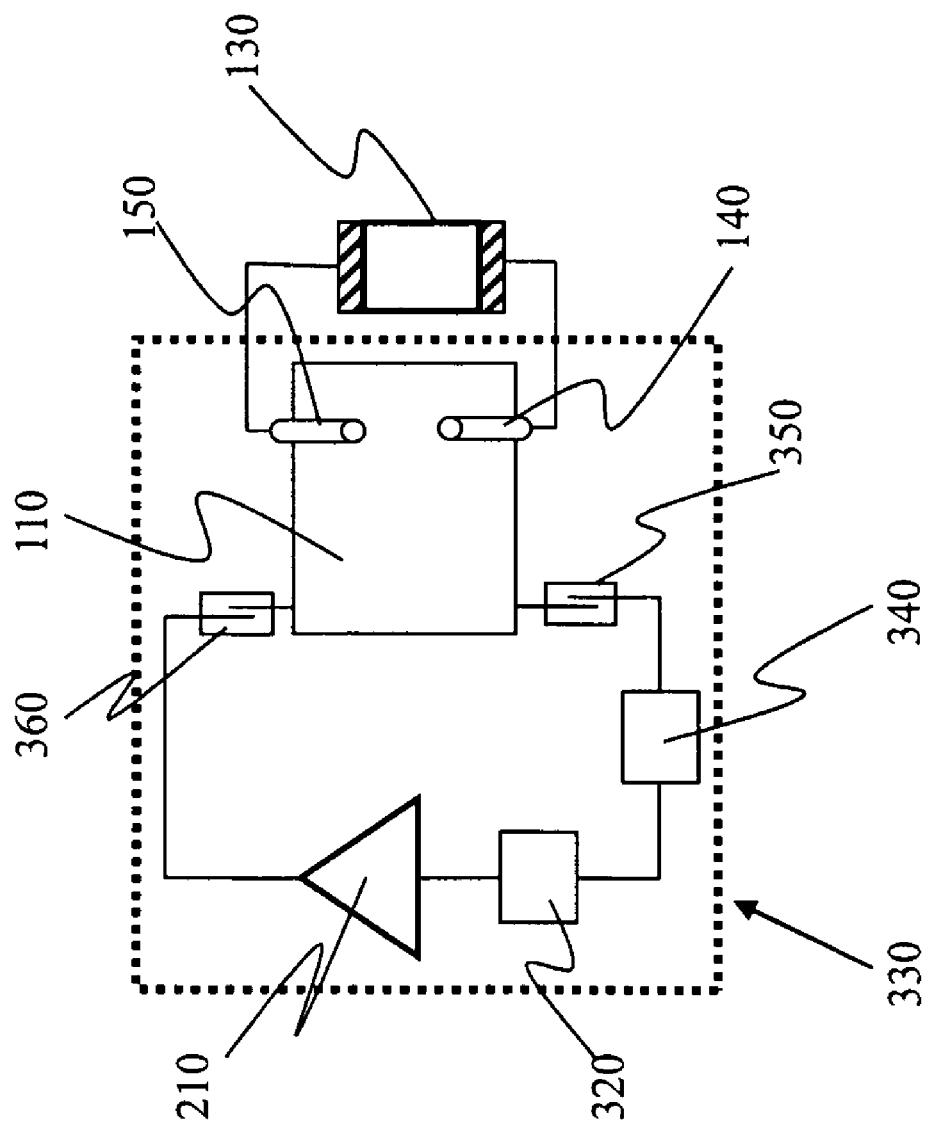
FIG. 3 depicts an electrode-less plasma lamp driven by sampling the field in the dielectric resonator of a Dielectric Resonator Oscillator (DRO)

FIG. 3 illustrates an embodiment of the plasma electrode-less lamp incorporating a Dielectric Resonant Oscillator (DRO) 330. In this case RF/microwave energy is sustained through feedback-induced oscillation. The DRO 330 couples energy to and from the electromagnetic resonator 110 through coupling structures 350 and 360. The sampled RF/microwave field is fed back to the amplification stages 210, in so doing the sample signal passes through delay elements 340 and loss elements 320. Provided the amplification stages can overcome the loop loss, oscillation will initiate at a frequency determined by the physical and geometrical properties of the resonator. First and second field probes 140 and 150 are positioned to sample the maximum electric field within the electromagnetic resonator 110; the sampled field is subsequently delivered to the gas-fill vessel 130. As can be appreciated by one of ordinary skill in the art, by separating the dielectric resonator (electromagnetic resonator 110) from the bulb (gas-fill vessel 130), the lamp design becomes much more flexible. As operating frequency is lowered, the size of the dielectric resonator needed increases, but by using much higher dielectric constant materials one can actually maintain or reduce the size of the dielectric resonator without concern about thermal mismatch between the dielectric resonator material and the bulb.

Figure 4B:
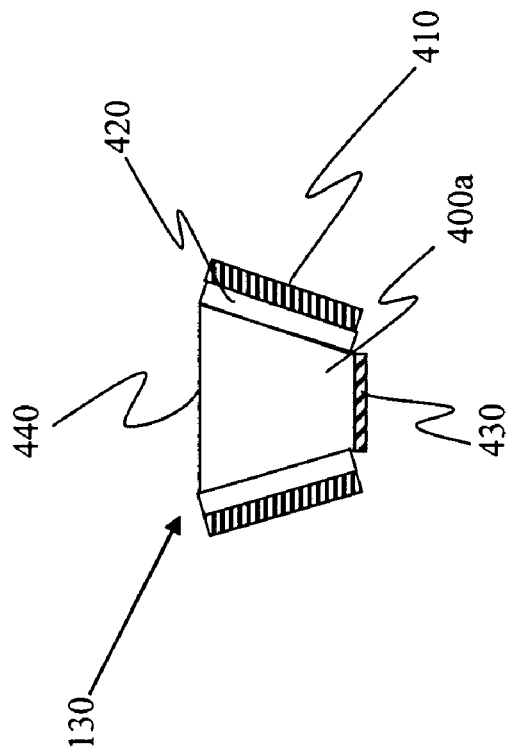
FIG. 4b is a gas-fill vessel—with diffusion barrier ends—in a configuration for increased light harvesting; one vessel wall includes an optical reflector made from a suitably reflective and non-absorptive material.
Figure 4A:
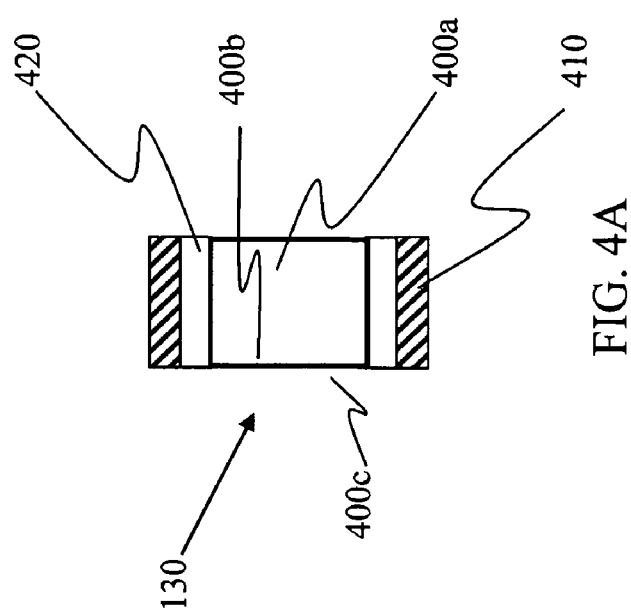
FIG. 4a is a gas-fill vessel which includes end caps that act as diffusion barriers, where ends are defined by the metallic electrodes (direction of the RF field across the gas-fill vessel)

FIG. 4A illustrates one possible embodiment of a gas-fill vessel 130. It comprises a transparent body 400a with an inner surface 400b and outer surface 400c. The transparent body can be made of quartz or some other suitably transparent and refractory material. A refractory veneer 420 covers a portion of the gas-fill vessel 130. This refractory veneer 420 can be made of suitable dielectrics, non-limiting examples of which include alumina, barium titanium oxide, titanium oxide, and silicon nitride; the refractory veneer could also be made from a refractory metal, non-limiting examples of which include tungsten, tantalum and titanium. A conductive veneer 410 is affixed onto the dielectric veneer 420; the conductive veneer 410 serves as a metal electrode. Radiation escapes the gas-fill vessel through the transparent body 400a. RF energy is capacitively coupled to the gas within the gas-fill vessel 130 through the conductive veneers 410, which act as metallic electrodes.

FIG. 4B shows a second embodiment of the gas-fill vessel 130, in which it is formed with a trapezoidal geometry. The gas and fluorophor or light emitter are enclosed by quartz side walls of the transparent body 400a. The ends of the trapezoidal cavity of the gas-fill vessel 130 are capped by a refractory veneer 420 (dielectric diffusion barrier), on which has been deposited a conductive veneer 410 (metallic electrode). The conductive veneer 410 and refractory veneer 420 form optical surfaces from which light reflects with minimal scattering and absorption. Additionally the gas-fill vessel 130 has a reflective portion 430, which can be made by depositing metal or dielectric layers on the quartz side walls of the transparent body 400a; the reflective portion enhances light harvesting as it exits through the transparent portion 440 of the gas-fill vessel 130.

As can be appreciated by one skilled in the art, although the above description utilized many specific measurements and parameters, the invention is not limited thereto and is to be afforded the widest scope possible. Additionally, although the device is described as being used as a lamp which produces visible light for illumination, it is not intended to be limited to this region of the electromagnetic spectrum and can be incorporated into a wide array of devices for a large variety of uses, including uses which require illumination in the ultra-violet and infrared portions of the electromagnetic spectrum.

What is claimed is:

1. A plasma electrode-less lamp, comprising:
    an electromagnetic resonator;
    an electromagnetic radiation source conductively connected with the electromagnetic resonator;
    a first field probe conductively connected with the electromagnetic resonator;
    a second field probe conductively connected with the electromagnetic resonator;
    a gas-fill vessel with a closed, transparent body having an outer surface and an inner surface, the inner surface forming a cavity, the gas fill vessel detached from the electromagnetic resonator and capacitively coupled with the first field probe and the second field probe; and
    a light emitter contained within the cavity of the gas-fill vessel, whereby the light emitter emits when electromagnetic radiation from the electromagnetic radiation source resonates inside the electromagnetic resonator.

2. A plasma electrode-less lamp as set forth in claim 1, wherein the electromagnetic resonator capacitively couples the electromagnetic radiation to the light emitter.

3. A plasma electrode-less lamp as set forth in claim 2, wherein the light emitter comprises a fluorophor.

4. A plasma electrode-less lamp as set forth in claim 1, further comprising:
    a first conductor with a first conductor probe end conductively connected with the first field probe and a first conductor vessel end connected with the gas fill vessel; and a second conductor with a second conductor probe end conductively connected with the second field probe and a second conductor vessel end connected with the gas fill vessel, whereby the two conductors form a transmission line that capacitively couples electromagnetic radiation into the gas-fill vessel.

5. A plasma electrode-less lamp as set forth in claim 4, wherein the first conductor and the second conductor impedance-match the electromagnetic resonator to the gas-fill vessel.

6. A plasma electrode-less lamp as set forth in claim 1, further comprising an impedance-matching network conductively connecting the first field probe with the gas fill vessel and the second field probe with the gas-fill vessel, whereby the impedance-matching network enables a substantially maximal amount of energy to be transferred to the gas-fill vessel when energy is stored in the electromagnetic resonator.

7. A plasma electrode-less lamp as set forth in claim 1, further comprising a gas, the gas contained within the gas-fill vessel, whereby the electromagnetic resonator capacitively couples the electromagnetic radiation to the light emitter by inducing the gas to become a plasma, which then transfers energy to the light emitter, causing the light emitter to emit.

8. A plasma electrode-less lamp as set forth in claim 1, wherein the electromagnetic radiation source is a tunable oscillator, whereby the tunable oscillator is tuned to maximize light output.

9. A plasma electrode-less lamp as set forth in claim 1, wherein the electromagnetic resonator is a lumped circuit comprising lumped circuit components.

10. A plasma electrode-less lamp as set forth in claim 1, wherein the electromagnetic resonator is a distributed structure.

11. A plasma electrode-less lamp as set forth in claim 1, wherein the electromagnetic resonator comprises lumped circuit components and distributed structures.

12. A plasma electrode-less lamp as set forth in claim 1, wherein the electromagnetic resonator is tunable, whereby the electromagnetic resonator is tuned to maximize light output.

13. A plasma electrode-less lamp as set forth in claim 12, wherein the electromagnetic resonator is a lumped circuit comprising lumped circuit components.

14. A plasma electrode-less lamp as set forth in claim 12, wherein the electromagnetic resonator is a distributed structure.

15. A plasma electrode-less lamp as set forth in claim 12, wherein the electromagnetic resonator comprises lumped circuit components and distributed structures.

16. A plasma electrode-less lamp as set forth in claim 1, further comprising:
a covered portion of the outer surface of the gas-fill vessel;
a refractory veneer connected with the covered portion of the outer surface of the gas-fill vessel; and
a conductive veneer connected with the refractory veneer so that the refractory veneer is between the covered portion and the conductive veneer, and the first field probe or the second field probe is conductively connected with the conductive veneer, whereby the refractory veneer acts as a diffusion barrier between the gas-fill vessel and the conductive veneer.

17. A plasma electrode-less lamp as set forth in claim 1, wherein the outer surface of the transparent body includes a reflective portion and a transparent portion, whereby light is made to reflect from the reflective portion and escape through the transparent portion, forcing the light to escape into a substantially smaller solid angle than it would if the reflective portion were absent.

18. A method of fabricating a plasma electrode-less lamp, comprising acts of:
forming an electromagnetic resonator;
conductively connecting an electromagnetic radiation source with the electromagnetic resonator;
conductively connecting a first field probe with the electromagnetic resonator;
conductively connecting a second field probe with the electromagnetic resonator;
forming a gas-fill vessel with a closed, transparent body, the transparent body having an outer surface and an inner surface, the inner surface forming a cavity, the gas fill vessel further being formed such that it is detached from the electromagnetic resonator and capacitively coupling the gas-fill vessel with the first field probe and the second field probe; and
inserting a light emitter within the cavity of the gas-fill vessel, whereby the light emitter emits when electromagnetic radiation from the electromagnetic radiation source resonates inside the electromagnetic resonator.

19. A method as set forth in claim 18, further comprising acts of:
forming a first conductor with a first conductor probe end and a first conductor vessel end;
conductively connecting the first field probe with the first conductor probe end;
connecting the gas fill vessel with the first conductor vessel end;
forming a second conductor with a second conductor probe end and a second conductor vessel end;
conductively connecting the second field probe with the second conductor probe end; and
connecting the gas fill vessel with the second conductor vessel end, whereby the two conductors form a transmission line that capacitively couples electromagnetic radiation into the gas-fill vessel.

20. A method as set forth in claim 19, wherein the first conductor and the second conductor are formed such that they impedance-match the electromagnetic resonator to the gas-fill vessel.

21. A method as set forth in claim 18, further comprising acts of forming an impedance-matching network, the impedance matching network being formed such that it conductively connects the first field probe with the gas fill vessel and conductively connects the second field probe with the gas-fill vessel, whereby the impedance-matching network enables a substantially maximal amount of energy to be transferred to the gas-fill vessel when energy is stored in the electromagnetic resonator.

22. A method as set forth in claim 18, further comprising acts of inserting a gas into the gas-fill vessel, whereby the electromagnetic resonator capacitively couples the electromagnetic radiation to the light emitter by inducing the gas to become a plasma, which then transfers energy to the light emitter, causing the fluorophor to fluoresce or light emitter to emit.

23. A method as set forth in claim 18, further comprising acts of:
forming the gas-fill vessel such that its outer surface has a covered portion;
connecting a refractory veneer with the covered portion of the outer surface of the gas-fill vessel;

connecting a conductive veneer with the refractory veneer so that the refractory veneer is between the covered portion and the conductive veneer; and conductively connecting the first field probe or the second field probe with the conductive veneer, whereby the refractory veneer acts as a diffusion barrier between the gas-fill vessel and the conductive veneer.

24. A method as set forth in claim 18, further comprising acts of:

forming the outer surface of the transparent body is formed such that it includes a reflective portion and a transparent portion; and covering the reflective portion with a reflective material, whereby light is made to reflect from the reflective portion and escape through the transparent portion, forcing the light to escape into a substantially smaller solid angle than it would if the reflective portion were absent.

25. A method of fabricating a plasma electrode-less lamp, comprising acts of:

conductively connecting an electromagnetic radiation source with an electromagnetic resonator;

conductively connecting a first field probe with the electromagnetic resonator;

conductively connecting a second field probe with the electromagnetic resonator;

inserting a light emitter within a gas-fill vessel, the gas-fill vessel arranged such that it is detached from the electromagnetic resonator, whereby the light emitter emits when electromagnetic radiation from the electromagnetic radiation source resonates inside the electromagnetic resonator, the electromagnetic resonator capacitively coupling the electromagnetic radiation to the gas-fill vessel containing the light emitter.

26. A method as set forth in claim 25, further comprising acts of:

conductively connecting a first conductor having a first conductor probe end and a first conductor vessel end with a first field probe, specifically connecting the first conductor probe end with the first field probe;

conductively connecting a second conductor having a second conductor probe end and a second conductor vessel end with a first field probe, specifically connecting the second conductor probe end with the second field probe;

connecting the gas fill vessel with the second conductor vessel end, whereby the two conductors form a transmission line that capacitively couples electromagnetic radiation into the gas-fill vessel.

27. A method as set forth in claim 26, wherein the first conductor and the second conductor are connected with the gas-fill vessel such that they impedance-match the electromagnetic resonator to the gas-fill vessel.

28. A method as set forth in claim 25, further comprising acts of conductively connecting the first field probe with the gas fill vessel via an impedance-matching network and conductively connecting the second field probe with the gas-fill vessel via the impedance-matching network, whereby the impedance-matching network enables a substantially maximal amount of energy to be transferred to the gas-fill vessel when energy is stored in the electromagnetic resonator.

29. A method as set forth in claim 25, further comprising acts of inserting a gas into the gas-fill vessel, whereby the electromagnetic resonator capacitively couples the electromagnetic radiation to the light emitter by inducing the gas to become a plasma, which then transfers energy to the light emitter, causing the light emitter to emit.

30. A method as set forth in claim 25, further comprising acts of:

connecting a refractory veneer with a covered portion of the outer surface of the gas-fill vessel;

connecting a conductive veneer with the refractory veneer so that the refractory veneer is between the covered portion and the conductive veneer; and conductively connecting the first field probe or the second field probe with the conductive veneer, whereby the refractory veneer acts as a diffusion barrier between the gas-fill vessel and the conductive veneer.

31. A method as set forth in claim 25, further comprising acts of:

covering a reflective portion of the transparent body with a reflective material, whereby light is made to reflect from the reflective portion and escape through the transparent portion, forcing the light to escape into a substantially smaller solid angle than it would if the reflective portion were absent.

* * * * *